Nov. 10, 1931.  R. C. HAM ET AL  1,831,559
ARTIFICIAL FLOWER
Filed Feb. 11, 1930

Patented Nov. 10, 1931

1,831,559

UNITED STATES PATENT OFFICE

ROBERT C. HAM AND MARION T. HAM, OF WEST HAVEN, CONNECTICUT, ASSIGNORS TO R. C. HAM & COMPANY, INCORPORATED, OF NEW HAVEN, CONNECTICUT

ARTIFICIAL FLOWER

Application filed February 11, 1930. Serial No. 427,619.

This invention relates to an artificial flower, and more especially to an artificial flower made of paper, fabric, or a moldable substance.

It is quite common in the art, to fashion flowers out of paper or fabric, or to mold them out of suitable substances, and while the invention disclosed and claimed herein relates more particularly to flowers made of paper or fabric, it is useful in many aspects with flowers made of moldable materials.

Flowers made of paper or fabric may be readily shaped during manufacture to simulate natural forms, but they are relatively fragile and soon lose their shapes upon being subjected to any but the most careful handling. They are also susceptible to damage by moisture and excessive temperature, and it is practically impossible to clean them after they become soiled.

In attempting to overcome the defects of the usual paper or fabric flower, it has become a common practice to coat them with wax or similar substances. Wax covered flowers, however, are relatively heavy and have an unnatural drooping effect. The wax becomes softened at quite ordinary temperatures, and when hard, is relatively brittle and apt to break. The coating of wax gives the petals of the flowers an unnatural thickness and the surface texture is unlike that of the natural product.

One of the objects of the invention is to produce an artificial flower having a more lifelike appearance than those heretofore known.

Another object of the invention is to produce an artificial flower which is less apt to become damaged when subjected to rough handling.

Still another object of the invention is to provide an artificial flower which may be preserved indefinitely in the shape given to it during manufacture.

A further object of the invention is to provide a flower which is not susceptible to changes in temperature within any range met with during the ordinary use thereof.

A still further object of the invention is to provide an artificial flower which is substantially, if not wholly, waterproof.

Many features of the invention will become apparent as the invention is described in connection with the annexed drawing.

To these and other ends the invention consists in the novel features and combination of parts to be hereinafter described and claimed.

The single figure in the drawing shows a flower in accordance with our invention.

For convenience, we shall now describe our invention in connection with the flower shown in the drawing which in this instance takes the form of a rose, but it is to be understood that the invention is not limited to use with an artificial rose, but may be carried out in connection with any other flower or plant which it is desired to simulate in artificial form.

The flower shown in the drawing comprises in general a main stem 5, having branches 6 and 7, branch 6 being provided with leaves 8 and 9, and terminating in a bud 10, while branch 7 is provided with leaves 11 and 12, and terminates in a blossom 13. The number of leaves, buds, and blossoms, and the arrangement thereof, may be varied as desired and form no part of our invention.

The stems are preferably, but not necessarily, made of wire wrapped with cloth or paper, while the leaves may be made of cloth or paper and attached to the stems prior to or during the wrapping thereof. The buds and blossoms may be made of paper or fabric, or molded out of suitable material. We prefer, however, to use crepe paper for this purpose, the petals of the flowers being cut in their natural outlines from a sheet of crepe paper and grouped together in a natural manner as they are attached to the stems. As the petals of the flowers are grouped, they are shaped to give them a natural or lifelike appearance. Crepe paper is highly desirable for this purpose owing to the fact that it may be readily stretched, curled or folded by workmen and tends to retain any shape that may be given to it.

Flowers made in accordance with the above description are somewhat generally known in the art. They are quite fragile, however, and soon lose their shapes and are destroyed unless they are carefully handled. We propose to coat the flowers with a material which gives them a more lifelike appearance and which preserves them against damage during any ordinary use. The material may be applied to the flowers in the form of a solution by the use of a hand-brush or an air-brush, but we prefer to dip the flowers in a bath of the material whereupon they are shaken to remove any surplus material and hung up to dry. During the drying process the flowers may be first suspended and then supported in an upright position and reversed in position one or more times in order to bring about an even disposition of the material.

It is necessary that the material used for coating the flowers be such that the shapes given to them during manufacture will not be destroyed, which is the case, for example, when crepe paper flowers are wet with materials dissolved in water whereupon they are soon reduced to a soggy, shapeless mass. In order that the manufacture of the flowers may be expedited, it is desirable and necessary from commercial aspects that the time taken for the coating to dry may be relatively short. Furthermore, the petals of the flowers, etc., must be left with a natural thickness and a natural condition of flexibility and a surface having a natural "feel."

We have found that pale crepe crude rubber when milled or otherwise mixed with magnesia, lime and paraffin and dissolved in naphtha, provides a coating for artificial flowers which has the above desirable characteristics. Flowers made of paper or fabric, or the like, may be shaped as desired and dipped in a solution of the above mixture without affecting, in any material way, the shapes given to the flowers during manufacture. The time taken for the solution to dry is relatively short and when dry the material adhering to the flowers does not have the appearance of a coating, as is the case with wax or the like, but appears to enter into and become an integral part of the paper or fabric, leaving the latter with a degree of flexibility and an appearance quite akin to the natural product. Furthermore, artificial flowers when coated with this material are water-proof and are unaffected by any temperature condition met with in ordinary use.

When the coating is substantially dry but is still somewhat sticky, the flowers are dusted with a powder which adheres to the surfaces thereof and penetrates into the coating to a certain extent. Any surplus powder adhering to the surfaces of the flowers may be removed by subjecting them to a blast of air. We have found that powdered soapstone is highly desirable as a dusting powder. Not only is powdered soapstone relatively unaffected by the presence of moisture, but in cooperation with the coating, it provides a surface texture quite like that of natural flowers.

The color of the flowers may be controlled by using colored paper or fabric for the construction thereof, and by applying additional color either before or after the flowers are coated. We may also use a colored solution of the coating material or colored powdered soapstone, or other colored powder, and if desired, a perfume may be added to the coating material.

Reference is had to the following as a specific example of a coating mixture which we have found highly desirable for the coating of paper or fabric flowers.

| | Per cent |
|---|---|
| Pale crepe crude rubber | 85 |
| Magnesia | 5 |
| Lime | 3½ |
| Paraffin | 6½ |

In preparing this mixture, the crude rubber may be milled in the usual manner and the solids gradually added thereto during the milling process. When the magnesia, lime and paraffin are thoroughly mixed in the crude rubber the compound is dissolved in a bath of naphtha, the amount of naphtha varying from 73 to 76 per cent. This solution is of a light brown color and in thin layers is substantially transparent. The viscosity of the solution varies with the amount of naphtha present and in the example given is not greatly unlike that of commercial rubber cement. The drying qualities and other characteristics are, for the present purposes, markedly superior to any rubber cement. The time taken for a coat of material to dry on crepe paper is about five minutes, and the coating when dry is of greatly reduced thickness as compared to its wet condition. There is also no tendency for bubbles to form on the surfaces, or webs or strings of materials to form between the adjacent petals or the like.

In certain instances where relatively large flowers are manufactured it may be desirable to stiffen the petals of the flowers or the leaves, and in such cases we prefer to coat the flowers or leaves with a solution of pure shellac, after which the flowers are coated with a solution of the coating material described above. We have also found it desirable in certain instances, to dip the flowers in the coating bath two or more times, the flowers being permitted to become dry or substantially dry before dipping.

Flowers made in accordance with our invention are of no greater weight than the natural product and will preserve their shapes notwithstanding any reasonable amount of rough treatment that they may be subjected to.

While we have shown and described a preferred embodiment of our invention, it will be understood that it is not to be limited to the details shown but is capable of modification and variation within the spirit of the invention and the scope of the appended claims.

What we claim is:

1. As a new article of manufacture, an artificial flower of paper coated with a material containing rubber, magnesia and lime.

2. In an artificial flower, a stem, and a plurality of pieces of sheet material mounted on said stem and simulating a blossom, said pieces of sheet material being impregnated with a solution containing rubber, magnesia and paraffin.

3. In an artificial flower, a stem, and a plurality of pieces of fibrous sheet material mounted on said stem and simulating a blossom, said pieces of sheet material being impregnated with a solution containing rubber, lime and paraffin.

4. In an artificial flower, a plurality of elements made of crepe paper, said elements being treated with a material containing crude rubber, magnesia, lime and paraffin.

5. In an artificial flower, a plurality of petals of fibrous material grouped together on a stem to simulate a blossom, said petals being impregnated with a solution of rubber in naphtha, and having a powder adhering to the surfaces thereof.

6. As a new article of manufacture, an artificial flower coated with a material containing crude rubber approximately 85%, magnesia approximately 5%, lime approximately 3½% and paraffin approximately 6½%.

7. As a new article of manufacture, an artificial flower having a blossom made of crepe paper, said paper being coated with a thin unvulcanized rubber-containing solution, and said paper having a powder adhering to the surface thereof.

8. As a new article of manufacture, an artificial flower having a blossom made of crepe paper, said paper being coated with a thin unvulcanized rubber-containing solution, and said paper having a powder adhering to the surface thereof, said powder being suitably colored to give the blossom the desired tint.

9. An artificial flower having a blossom constructed of crepe paper, said blossom being treated with a thin light-colored solution containing pale crepe rubber and the surface of the paper having applied thereto a suitable powder as and for the purposes described.

10. An artificial flower whose petals are made of paper, said material being treated with a solution containing pale crepe rubber which renders the flower moisture-repellent and washable and adds to the strength and durability thereof, said rubber containing solution being unvulcanized and the petal surfaces having a suitable powder applied thereto.

11. As a new article of manufacture, an artificial flower having a blossom made out of crepe paper of suitable color, cut and folded to shape, said flower having a pale substantially transparent and thin coating applied to the opposite faces and edges of the petals and rendering the flower moisture-repellent and washable without substantially stiffening the same, the surface of the flower being non-tacky and substantially devoid of gloss.

12. As a new article of manufacture, an artificial flower having a blossom made out of crepe paper of suitable color, cut and folded to shape, said flower having a pale substantially transparent and thin coating containing unvulcanized rubber as its principal ingredient applied to the petals and rendering the flower moisture-repellent and washable without substantially stiffening the same, the surface of the flower being non-tacky and substantially devoid of gloss.

In witness whereof, we have hereunto set our hands this 6th day of February, 1930.

ROBERT C. HAM.
MARION T. HAM.